(12) United States Patent
Gu et al.

(10) Patent No.: US 11,493,821 B2
(45) Date of Patent: Nov. 8, 2022

(54) PIEZO ELECTROPHORETIC DISPLAY

(71) Applicant: E Ink California, LLC, Fremont, CA (US)

(72) Inventors: Haiyan Gu, Fremont, CA (US); Hanan Liu, Milpitas, CA (US); HongMei Zang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 490 days.

(21) Appl. No.: 16/538,899

(22) Filed: Aug. 13, 2019

(65) Prior Publication Data

US 2020/0057348 A1 Feb. 20, 2020

Related U.S. Application Data

(60) Provisional application No. 62/718,587, filed on Aug. 14, 2018.

(51) Int. Cl.
*G02F 1/167* (2019.01)
*B43L 1/00* (2006.01)
(Continued)

(52) U.S. Cl.
CPC ............. *G02F 1/1685* (2019.01); *B43L 1/00* (2013.01); *G02F 1/167* (2013.01);
(Continued)

(58) Field of Classification Search
CPC ....... A61B 8/12; A61B 8/4438; A61B 8/4477; A61B 8/4483; A61B 8/52; A61B 8/565; A61B 1/00016; A61B 1/00029; A61B 1/041; A61B 1/0653; A61B 1/0684; A61B 2560/0214; A61B 2560/0219; A61B 2562/08; A61B 5/0002; A61B 5/0031; A61B 5/053; A61B 5/0538; A61B 5/227; A61B 5/413; A61B 5/7405; A61B 5/7455; G02F 1/1685; G02F 1/167; G02F 1/1675;
(Continued)

(56) References Cited

U.S. PATENT DOCUMENTS 3,383,993 A 5/1968 Yeh
4,418,346 A 11/1983 Batchelder
(Continued)

FOREIGN PATENT DOCUMENTS

JP 2002014380 A 1/2002
JP 2009265271 A 11/2009
(Continued)

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.
(Continued)

*Primary Examiner* — Brandi N Thomas
(74) *Attorney, Agent, or Firm* — Jason P. Colangelo

(57) ABSTRACT

A writing apparatus including a first electrode, a layer of piezoelectric material; and a layer of electrophoretic material positioned between the first electrode and the layer of piezoelectric material, wherein stress on the layer of piezoelectric material results in optical changes in the layer of electrophoretic material.

8 Claims, 3 Drawing Sheets

(51) Int. Cl.
*G02F 1/1685* (2019.01)
*G06F 3/0354* (2013.01)
*G02F 1/16757* (2019.01)

(52) U.S. Cl.
CPC ...... *G06F 3/03545* (2013.01); *G02F 1/16757* (2019.01); *G02F 2201/44* (2013.01)

(58) Field of Classification Search
CPC ........... G02F 1/133394; G02F 1/16755; G02F 1/16757; G02F 1/1676; G02F 2001/1678; G02F 2201/44; G02F 2202/10; G02F 2202/16; G02F 2203/68; B06B 1/0207; B06B 1/0292; B06B 1/06; B06B 2201/40; B06B 2201/76; H01L 41/0973; H01L 27/20; H01L 41/317; H01L 41/107; H01L 41/314; H01L 41/1876; H01L 41/1875; H01L 41/0805; H01L 41/0474; H01L 41/316; H01L 41/41; H01L 41/273; H01L 41/29; H01L 41/43; H01L 41/08; H01L 41/33; H01L 41/0477; H01L 41/0471; H01L 41/083; H01L 41/27; H01L 21/02164; H01L 21/0217; H01L 21/02274; H01L 21/0228; H01L 21/31111; H01L 21/31133; H01L 21/56; H01L 23/291; H01L 23/3121; H01L 23/3192; H01L 23/49894; H01L 25/0655; H01L 27/28; H01L 2924/0002; H01L 41/0536; H01L 41/0833; H01L 41/094; H01L 41/098; H01L 41/293; H01L 41/312; H01L 51/0003; H01L 51/0023; H01L 51/005; H01L 51/0077; H01L 51/0508; H01L 51/0512; H01L 51/0541; H01L 51/0545; H01L 51/105; H01L 41/0472; H01L 41/0533; H01L 41/0831; H01L 41/0926; H01L 41/0946; H01L 41/1132; H01L 41/1136; H01L 41/193; H01L 41/297; H01L 41/31; H01L 41/35; H01L 41/45
See application file for complete search history.

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,473,072 B1 | 10/2002 | Comiskey et al. |
| 6,672,921 B1 | 1/2004 | Liang et al. |
| 6,704,133 B2 | 3/2004 | Gates et al. |
| 6,738,050 B2 | 5/2004 | Comiskey et al. |
| 6,788,449 B2 | 9/2004 | Liang et al. |
| 6,866,760 B2 | 3/2005 | Paolini Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,339,715 B2 | 3/2008 | Webber et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,535,624 B2 | 5/2009 | Amundson et al. |
| 7,561,324 B2 | 7/2009 | Duthaler et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 8,009,348 B2 | 8/2011 | Zehner et al. |
| 8,319,759 B2 | 11/2012 | Jacobson et al. |
| 9,279,906 B2 | 3/2016 | Kang |
| 9,846,493 B2 | 12/2017 | Gila et al. |
| 10,203,793 B2 | 2/2019 | Grosse-Puppendahl et al. |
| 2005/0253801 A1 | 11/2005 | Kobayashi |
| 2006/0279527 A1* | 12/2006 | Zehner ............... G09G 3/38 345/107 |
| 2009/0051646 A1 | 2/2009 | Daniel et al. |
| 2012/0127136 A1* | 5/2012 | Schneider ........... G02F 1/13718 349/23 |
| 2012/0293858 A1 | 11/2012 | Telfer et al. |
| 2018/0329558 A1 | 11/2018 | Park et al. |

FOREIGN PATENT DOCUMENTS

| | | |
|---|---|---|
| KR | 20070082346 A | 8/2007 |
| KR | 20080094252 A | 10/2008 |
| KR | 20160090588 A | 8/2016 |
| TW | 201017496 A | 5/2010 |

OTHER PUBLICATIONS

Wood, D., "An Electrochromic Renaissance?" Information Display, 18(3), 24 (Mar. 2002) Mar. 1, 2002.

Bach, Udo et al., "Nanomaterials-Based Electrochromics for Paper-Quality Displays", Adv. Mater, vol. 14, No. 11, pp. 845-348, (Jun. 5, 2002) Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

Chiang et al., "A stylus writable electrophoretic display device" SID International Symposium Digest of Technical Papers, May 1979 (May 1979), pp. 44-45, XP002102514 Coral Gables, FL, USA May 1, 1979.

Korean Intellectual Property Office, PCT/US2019/046258, International Search Report and Written Opinion, Dec. 3, 2019. Dec. 3, 2019.

European Patent Office, "European Search Report", EP Appl. No. 19850125.6, dated Apr. 12, 2022. Apr. 12, 2022.

* cited by examiner

PIEZO ELECTROPHORETIC DISPLAY

REFERENCE TO RELATED APPLICATIONS

This application is related to and claims priority to U.S. Provisional Application No. 62/718,587 filed on Aug. 14, 2018.

The entire disclosures of the aforementioned application is herein incorporated by reference.

SUBJECT OF THE INVENTION

The subject matter disclosed herein relates to piezo electrophoretic displays which may be activated or driven without being connected to a power source, and methods of operating such devices.

BACKGROUND

Non-emissive displays convey information using contrast differences, which are achieved by varying the reflectance of different frequencies of light; they are thus distinct from traditional emissive displays, which stimulate the eye by emitting light. One type of non-emissive display is an electrophoretic display, which utilizes the phenomenon of electrophoresis to achieve contrast. Electrophoresis refers to movement of charged particles in an applied electric field. When electrophoresis occurs in a liquid, the particles move with a velocity determined primarily by the viscous drag experienced by the particles, their charge, the dielectric properties of the liquid, and the magnitude of the applied field.

An electrophoretic display utilizes charged particles of one color suspended in a dielectric liquid medium of a different color (that is, light reflected by the particles) is absorbed by the liquid. The suspension is housed in a cell located between (or partly defined by) a pair of oppositely disposed electrodes, one of which is transparent. When the electrodes are operated to apply a DC or pulsed field across the medium, the particles migrate toward the electrode of opposite sign. The result is a visually observable color change. In particular, when a sufficient number of the particles reach the transparent electrode, their color dominates the display; if the particles are drawn to the other electrode, however, they are obscured by the color of the liquid medium, which dominates instead.

SUMMARY

According to one aspect of the subject matter disclosed herein, a writing apparatus includes a first electrode, a layer of piezoelectric material, and a layer of electrophoretic material positioned between the first electrode and the layer of piezoelectric material, wherein stress on the layer of piezoelectric material results in optical changes in the layer of electrophoretic material.

DETAILED DESCRIPTION

Figure 1:
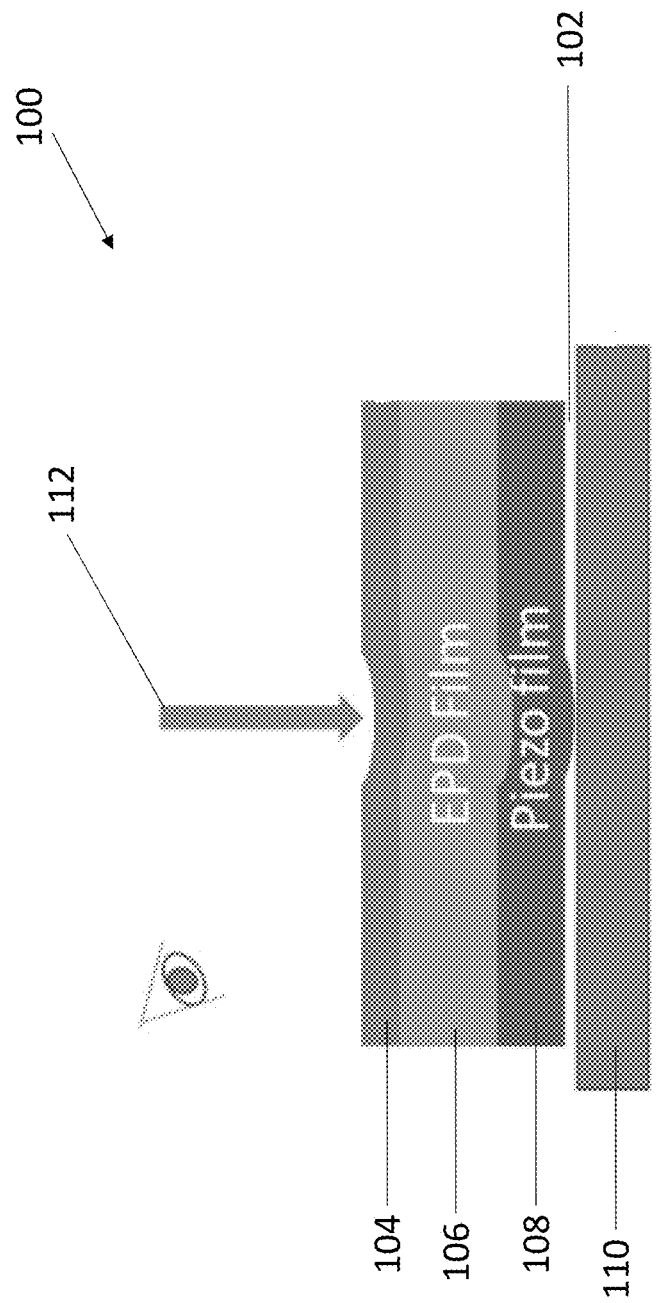
FIG. 1 is a cross sectional view of an exemplary writing apparatus in accordance with the subject matter disclosed herein.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a display or drive scheme which only drives pixels to their two extreme optical states with no intervening gray states.

The term "pixel" is used herein in its conventional meaning in the display art to mean the smallest unit of a display capable of generating all the colors which the display itself can show. In a full color display, typically each pixel is composed of a plurality of sub-pixels each of which can display less than all the colors which the display itself can show. For example, in most conventional full color displays, each pixel is composed of a red sub-pixel, a green sub-pixel, a blue sub-pixel, and optionally a white sub-pixel, with each of the sub-pixels being capable of displaying a range of colors from black to the brightest version of its specified color.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 7,075,502 and 7,839,564;
(f) Methods for driving displays; see for example U.S. Pat. Nos. 7,012,600 and 7,453,445;
(g) Applications of displays; see for example U.S. Pat. Nos. 7,312,784 and 8,009,348;
(h) Non-electrophoretic displays, as described in U.S. Pat. Nos. 6,241,921; 6,950,220; 7,420,549 and 8,319,759; and U.S. Patent Application Publication No. 2012/0293858;
(i) Microcell structures, wall materials, and methods of forming microcells; see for example U.S. Pat. Nos. 7,072,095 and 9,279,906; and
(j) Methods for filling and sealing microcells; see for example U.S. Pat. Nos. 7,144,942 and 7,715,088.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode;

see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed, using a variety of methods, the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

In yet another embodiment, such as described in U.S. Pat. No. 6,704,133, electrophoretic displays may be constructed with two continuous electrodes and an electrophoretic layer and a photoelectrophoretic layer between the electrodes. Because the photoelectrophoretic material changes resistivity with the absorption of photons, incident light can be used to alter the state of the electrophoretic medium. Such a device is illustrated in FIG. 1. As described in U.S. Pat. No. 6,704,133, the device of FIG. 1 works best when driven by an emissive source, such as an LCD display, located on the opposed side of the display from the viewing surface. In some embodiments, the devices of U.S. Pat. No. 6,704,133 incorporated special barrier layers between the front electrode and the photoelectrophoretic material to reduce "dark currents" caused by incident light from the front of the display that leaks past the reflective electro-optic media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly (ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No.

6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The photoelectrophoretic properties of certain pigments were recognized some time ago. For example U.S. Pat. No. 3,383,993 discloses a photoelectrophoretic imaging apparatus that could be used to reproduce projected images on a medium, typically a transparent electrode, such as ITO. The photoelectrophoretic process described in the '993 patent, and other related patents by Xerox Corporation, was not reversible, however, because the photoelectrophoretic process involved the photoelectrophoretic particles migrating to an "injecting electrode" where they would become attached to the electrode. Because of the lack of reversibility, as well as the cost and complication of the setup, this phenomenon was not commercialized widely.

The subject matter presented herein relates to several piezo electrophoretic display structural designs which do not need a power supply (e.g., battery or wired power supply etc.) in order for the electrophoretic display to operate. The assembly of such an electrophoretic display is therefore simplified.

Piezoelectricity is the charge which accumulates in a solid material in response to applied mechanical stress. Suitable materials for the subject matter disclosed herein may include polyvinylidene fluoride (PVDF), quartz ($SiO_2$), berlinite ($AlPO_4$), gallium orthophosphate ($GaPO_4$), tourmaline, barium titanate ($BaTiO_3$), lead zirconate titanate (PZT), zinc oxide (ZnO), aluminum nitride (AlN), lithium tantalite, lanthanum gallium silicate, potassium sodium tartrate and any other known piezo materials.

Many electrophoretic displays are bi-stable: their state persists even after the activating electric field is removed. This is generally achieved via residual charge on the electrodes and van der Waals interactions between the particles and the walls of the electrophoretic cell. The driving of an electrophoretic display requires a power source, such as a battery to provide power to the display and/or its driving circuitry. The power source may be a driver IC in order to generate an electric field. The electric field may also need to be enhanced by a circuitry. In any case, a physical connection through wires is required to attach the power source to the electrophoretic display and its driving circuitry.

An erasable drawing device is known. An erasable drawing device, typically, consists of a blackboard, paper pad, or white board, and an erasable marking device such as a chalk, pencil or dry-erasable marker.

One drawback of such drawing device is that the marking device can dissipate, requiring replacement. Another drawback is that the marking device can make marks on surfaces other than the screen of the drawing device, thereby creating a mess. Still another drawback is that the screen may not erase completely even with cleansers and vigorous erasing.

An electronic drawing device overcomes some the problems described above. An electronic drawing device, typically, includes a touch screen and appropriate logic to cause an underlying electronic display to update its image in response to the motion of a stylus. The device, for example, includes a graphics input pad having an array of transparent capacitive pixels, which change their capacitance in response to a conductive tipped stylus passing over the pad. The change in capacitance is sensed and used to address an LCD matrix. A drawback of this electronic drawing device is that it requires sophisticated electronics and significant amount of power.

A magnetophoretic display, typically used as children's drawing toy, is another example of an erasable drawing device. In a magnetophoretic display, a stylus used to write on the display contains a magnet, and a contrast media on the display contains black ferrous material and white titanium dioxide. The magnetophoretic display requires no power. However, the magnetophoretic display does not typically permit the user to selectively erase portions of a drawing on the display, unless the user is able to access both the front and back of the magnetophoretic media. Typically, manufacturers of magnetophoretic displays simply provide access to only one surface. The display is erased using a sliding bar magnet embedded behind the magnetophoretic media. Therefore, the display cannot be selectively erased.

An electrostatically-addressed liquid crystal display is another type of drawing device known in the art. Liquid crystal drawing devices, however, suffer from poor image duration due to dissipation of the surface static charge which maintains the image. With higher voltages and additional resistive layers, it is possible to extend image duration, but even then, a duration exceeding 30 minutes is considered state of the art.

An electrophoretic display is also used as a drawing device. In an electrophoretic drawing device, electrophoretic particles in a display media of the device migrate toward or away from the drawing surface of the device upon application of an electric field across the display media. For example, the drawing device can contain a back electrode covered by an electrophoretic coating. To write, a positive voltage is applied to the back electrode and a stylus contacting the electrophoretic coating is set at ground. The stylus acts as a top electrode in a local area. A voltage potential is created between the stylus and the back electrode which causes migration of the electrophoretic particles and a color change of the device. The overall system may be covered with a dielectric or anisotropic top layer that protects the electrophoretic media. Chiang et al. "A Stylus Writable Electrophoretic Display Device," Society for Information Display 1979 Digest describes an electrophoretic drawing device. Although this type of electrophoretic displays can offer excellent contrast and brightness as well as favorable electrical properties and image duration, they still needs to be electrically powered to function.

Some aspects of the subject matter presented herein utilizes the piezoelectricity to drive the pigments of an electrophoretic material, to change the color of the electrophoretic material when viewed from a viewing surface. For example, by bending or introduce stress to a piece of piezo material, charges may be generated and these charges can be utilized to cause movement of the colored pigments of the electrophoretic material. As used herein, the term "contrast ratio" (CR) for an electro-optic display (e.g., an electrophoretic display) is defined as the ratio of the luminance of the brightest color (white) to that of the darkest color (black) that the display is capable of producing. Normally a high contrast ratio, or CR, is a desired aspect of a display.

As mentioned above, in some embodiments, a piezoelectric material may be used to generate charges for powering a writable apparatus having an electrophoretic material. This writable apparatus can function without a power source, powered solely by charges generated by the piezoelectric material. In practice, a user may write on this apparatus using a stylus (conductive or non-conductive), or any pointed object, and also erase the writing, without the need of coupling to a power source.

FIG. 1 illustrates an exemplary embodiment of a writable apparatus in accordance with the subject matter disclosed herein. As illustrated in FIG. 1, apparatus 100 may include a layer of electro-optic medium 106 (e.g., a layer of electrophoretic material) positioned between a first electrode 104 and a layer of piezoelectric material 108. This layer of electrophoretic material may include micro-cells or micro-capsules with electrophoretic particles, or any other electrophoretic material commonly used in the art. In some embodiments, the top electrode 104 may be a layer of light-transmissive electrically-conductive material, where the term "light-transmissive" is used herein to describe the layer 104 to be capable of transmitting sufficient light to enable an observer, looking through that layer 104, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. It should be appreciated that there should be no continuous conductor between the electrophoretic material 106 and the piezoelectric material 108. The absence of a conductor between these two layers can improve the CR of the writing apparatus.

Furthermore, in some embodiments, there may be a second electrode 110 positioned at another side, opposite from the electrophoretic material 106, of the piezoelectric material 108. This second electrode 110 can be separated from the piezoelectric material 108 by a gap or spacing 102, preferably this gap 102 is a narrow one. In practice, a stylus 112 may be used to apply a stress onto the piezoelectric material 108. The stylus 112 may press upon the first electrode 104 as if the stylus 112 is being used for writing on the first electrode 104. This pressing force can cause the electrophoretic material 106 and the piezoelectric material 108 to bend accordingly. Ideally, this bending can cause the piezoelectric material 108 to come in contact with the second electrode 110 across the gap 102. In this fashion, when the piezoelectric material 106 experiences this stress caused by the stylus 112 writing on the first electrode 104, the piezoelectric material 106 generates charges as a result. In some embodiments, when the piezoelectric material 106 comes into contact with the second electrode 110, a conduction path may be formed which allows the generated charges to cause movement of the colored pigments within the electrophoretic material 106, where the movement of the pigments can cause change in optical state of the electrophoretic material 106 (e.g., where the stylus 112 is writing, the electrophoretic material 106 may turn from white to black). Similar to the embodiment presented in FIG. 1, it should be appreciated here that there is no continuous conductor present between the piezoelectric material and the electrophoretic material where writing is expected to taking place. The absence of the continuous conductor may contribute to a better CR of the writing device.

In some embodiments, instead of the gap 102, the piezo film 108 may be positioned on top of the second electrode 110 without lamination. In this fashion, the piezo film 108 is in slight contact with the second electrode 110. And when the stylus 112 is performing a writing operation on the first electrode 104, the stylus 112 can apply a force onto the EPD film 106 and piezo film 108 and causing both film to bend in the vertical direction. Such bending and the applied force can create a closer contact between the piezo film 108 and the second electrode 110, and causing a change in resistance between the piezo film 108 and the second electrode 110. In use, such change in resistance and the charges produced by the piezo film 110 can result in visible lines (e.g., black lines) to appear alone where the stylus has been writing.

In practice, the size of the stylus 112 may affect the sharpness and/or contrast ratio of the writings on the electrophoretic material 106. For example, a smaller or fine tipped stylus 106 may produce writings that are sharp and/or clear, compared to a stylus with a larger sized tip. This may be due to the fact that a smaller tipped stylus, when writing on the first electrode 104, creates a compression or stress force to the electrophoretic film 106 and piezoelectric film 108 below, which also creates a relatively small contacting surface area with the second electrode 110. Due to this relatively small contact surface area (compared to a stylus with larger sized tips), an electrical field produced by the charges from the piezoelectric film may be localized to a smaller region compared to that of a stylus with a larger tip, which increases the magnitude of the electric field produced, in turn producing a shaper writing with improved CR. In some other embodiments, the thickness of the electrophoretic layer and the overall thickness of the writing apparatus 100 may also affect the sharpness and/or CR of the writing. This may due to the fact that thicker the apparatus, the bigger the curvature created due to writing and therefore the larger the contacting surface area, which reduces the localization of the electric field created. It should be appreciated that the stylus 112 used here does not need to be made from conductive materials.

Similarly, the writing apparatus 100 may be bend (e.g., compressed) or written from the direction of the second electrode 110 towards the first electrode 104. In this fashion, the electrophoretic film 106 is bend or compressed from a direction that is opposite to what is described above, where the electrophoretic film 106 is bend or compressed toward the first electrode layer 104 instead. As such, the charges produced by the electrophoretic film 106 will flow to an opposite direction as described above and producing an electric field that is also opposite. Accordingly, the colored pigments of the electrophoretic material 106 will move to a direction that is opposite to what is described above and producing a different optical change. For example, writing on the second electrode 110 can produce writings of different colors on the first electrode 104, compared to that when writing on the first electrode 104. If writing on the first electrode 104 produces black colored lines on the first electrode 104, writing on the second electrode 110 would produce lines that are not black, for example, white lines. In some embodiments, one may erase the writings on the first electrode 104 by producing stress on the second electrode 110. For example, writing produced on the first electrode 104 may be of black color. Producing stress (e.g., writing) on the second electrode 110 at approximately the same locations may produce writings in white color on the first electrode 104, thereby effectively erasing or masking the black writings. It should be appreciated that the second electrode 110 preferably should have a resistance of less than $10^{13}$ ohms. A resistivity over that limit may cause the second electrode 110 to be not sufficiently conductive for the apparatus 100 to function properly.

In some embodiments, the electrophoretic material 106 used in apparatus 100 may be an electrophoretic material designed for low voltage applications. Such material may include micro-cells with shallower than usual cell depth or heights. Example of micro-cell based electrophoretic medium or display may be found in U.S. Pat. Nos. 7,072,095 and 9,279,906, which are incorporated herein in their entirety. In some embodiments, if regular or standard micro-cells have 60 cell depths or height, a low voltage material may have cell height or depths that is 40 micros or lower. In some other embodiments, the micro-cell height or depth may be less than 20 microns. In some embodiments, fluids sealed inside the micro-cells may also have different chemical compositions for the shallow micro-cells. For example, the electrophoretic material 106 may have an internal phase with viscosity of 1 Pa*S, and a particle concentration of 39%. Illustrated below in Table 1 is an example of an electrophoretic material that may be utilized.

TABLE 1

Low Voltage Application Electrophoretic Material
2.2.1. FPL Specification

| Attribute | Value |
| --- | --- |
| 25 C Optical Targets (Typical T0) | WS: 33% (64 L*) DS: 3.2% (21 L*) CR: 11 |
| 25 C LTiD after 24 hrs (Minimum T0) | WS: ≥30% (62 L*) DS: <4.4% (25 L*) CR > 7 |
| Ghosting | Δ L* < 2 |
| 0 C Optical Targets | WS: ≥28% (60 L*) DS: <4% (24 L*) CR > 7 |
| Imaging update time | 0 C: LT WF (PD1500 2 Phase, 3 sec) 25 C: RT WF (1.72 sec) |

Figure 2:
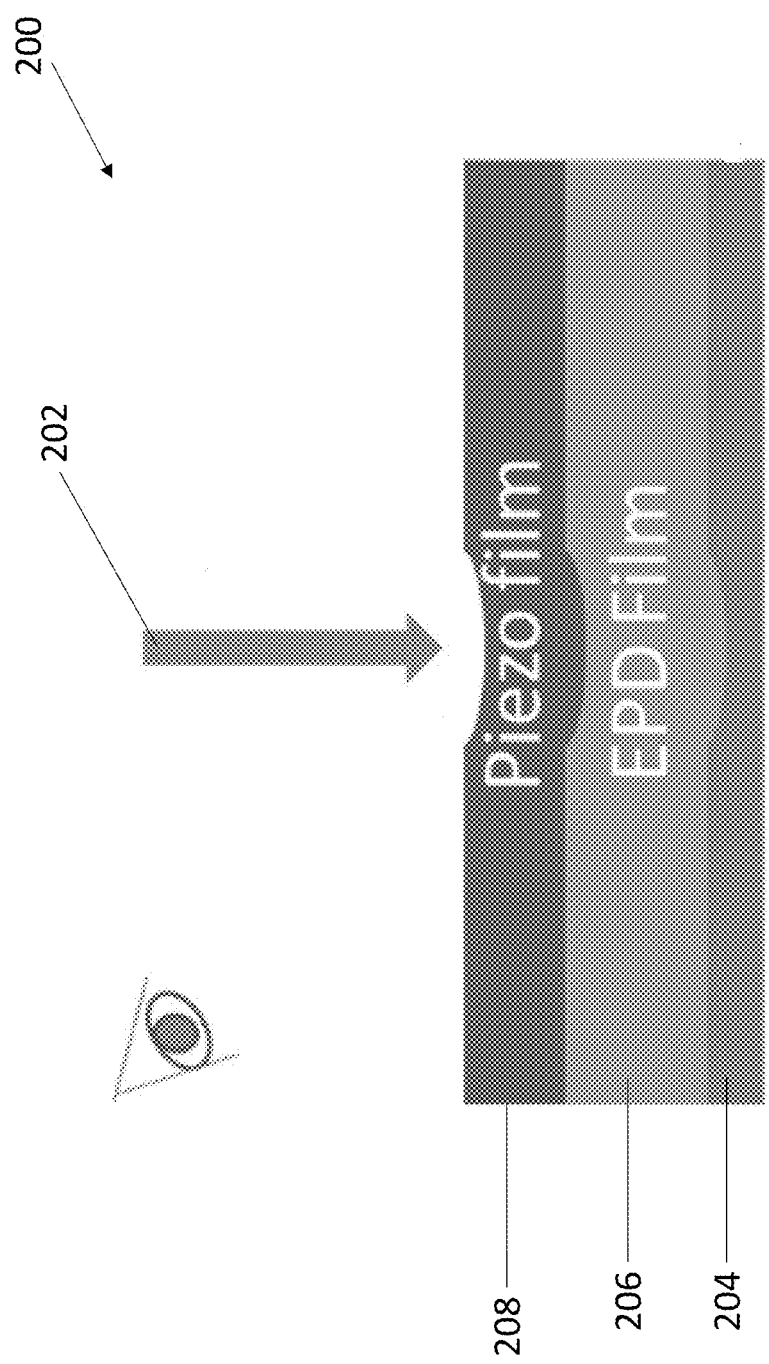
FIG. 2 is a cross sectional view of another writing apparatus in accordance with the subject matter disclosed herein.

*EO spec. was based on Eye-one measurement on FPL + 25 μm OCA + PS2 protective layer on 2" 124 dpi TFT backplane In some other embodiments, a conductive stylus 202 may be used to write directly onto the piezoelectric material, as illustrated in FIG. 2. In this configuration, the writing apparatus 200 may have only a first electrode 204. An electrophoretic material 206 may be positioned between the first electrode 204 and a piezoelectric film material 208. However, writing is done directly onto the piezoelectric material in this case with the conductive stylus 202. The compression onto the piezoelectric material 208 caused by the stylus 202 can generated charges, which may be used to change the optical states of the electrophoretic material 206. It should be noted that the stylus 202 used herein is preferably made out of conductive material.

Figure 3:
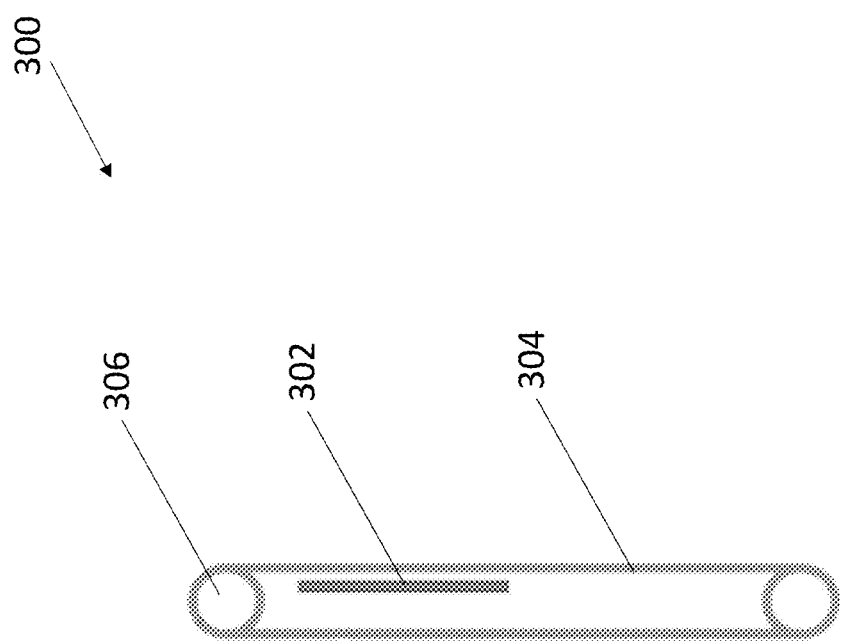
FIG. 3 is an embodiment of a writing board in accordance with the subject matter disclosed herein.

FIG. 3 illustrates one embodiment where the configurations presented in FIGS. 1 and 2 may be integrated into a large sized writing apparatus 300. In some embodiments, the entire apparatus may contain a writing unit 302 which includes rows of mechanical stylus, and writing may be done on the writing unit 302. The writing unit 302 may be the same size as the display unit, or smaller than the display unit 304, depending on the application. The writing apparatus may also include an erasing unit 306 in the form of a roller, where continuous rolling action may erase the entire board. In some embodiments, the material used for erasing needs to have both lower resistivity <$10^{13}$ Ohm/sq and elastic property. Non-limiting examples of such material are silicone rubber, natural latex rubber, thermoplastic elastomers (TPE), thermoplastic vulcanizates (TPE-v), thermoplastic urethanes (TPU), and ethylene-vinyl acetates (EVA), each having additives such as carbon, copper, nickel or silver fragments.

In some embodiments, the resistivity of the writing stylus may be similar to that of the eraser or erasing device mentioned above.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A writing apparatus comprising:
a first electrode;
a layer of piezoelectric material;
a layer of electrophoretic material positioned between the first electrode and the layer of piezoelectric material, wherein stress on the layer of piezoelectric material results in optical changes in the layer of electrophoretic material;
a second electrode positioned on a side of the piezoelectric material opposite of the first electrode; and
a gap positioned between the layer of piezoelectric material and the second electrode.

2. The apparatus of claim 1 wherein the layer of electrophoretic material is micro-cell based.

3. The apparatus of claim 1 wherein the layer of electrophoretic material is micro-capsule based.

4. The apparatus of claim 1 further comprising a stylus.

5. The apparatus of claim 4 wherein the stylus is nonconductive.

6. The apparatus of claim 4 wherein the stylus is conductive.

7. The apparatus of claim 1 wherein the second electrode has a resistivity of less than 10^13 ohms/sq.

8. The apparatus of claim 2 wherein the micro-cells have a height of less than 20 microns.

* * * * *